United States Patent [19]
Shiotsu et al.

[11] Patent Number: 6,048,210
[45] Date of Patent: *Apr. 11, 2000

[54] PLANETARIUM

[75] Inventors: Nozomu Shiotsu; Rie Matsubara, both of Toyokawa, Japan

[73] Assignee: Minolta Planetarium Co., Ltd., Osaka, Japan

[*] Notice: Under 35 U.S.C. 154(b), the term of this patent shall be extended for 12 days.

[21] Appl. No.: 08/663,849

[22] Filed: Jun. 14, 1996

[30] Foreign Application Priority Data

Jun. 15, 1995 [JP] Japan .................................. 7-147961

[51] Int. Cl.⁷ .................................................. G09B 27/00
[52] U.S. Cl. ............................ 434/286; 434/284; 353/94
[58] Field of Search .................................. 434/286, 285, 434/284, 289; 353/94

[56] References Cited

U.S. PATENT DOCUMENTS 3,574,955  4/1971  Skolnick .
4,639,224  1/1987  Maejima et al. .
5,492,475  2/1996  Hattori ................................... 434/286

FOREIGN PATENT DOCUMENTS 2 050 775  7/1981  United Kingdom .

OTHER PUBLICATIONS

U.S. application No. 08/358,821, filed Dec. 1994.

*Primary Examiner*—Glenn E. Richmon
*Attorney, Agent, or Firm*—McDermott, Will & Emery

[57] ABSTRACT

In a planetarium apparatus, a first controller controls a projector for projecting a state of celestial bodies as observed from a selected first viewpoint onto a dome, and a second controller controls a display and/or a video projector for displaying said state of celestial bodies as observed from a selected second viewpoint onto the dome and/or on other screen.

16 Claims, 9 Drawing Sheets

PLANETARIUM

BACKGROUND OF THE INVENTION

1. Technical Field of the Invention

The present invention relates to a planetarium, particularly to an operation of a planetarium apparatus and its simulation functions.

A planetarium apparatus has been generally used to project a state of star fields, constellations, and celestial bodies or to simulate their various movements not only as observed from the earth but also from other planets or any viewpoint in space. It is essential for an operator to be aware of his exact position to conduct a precise operation and to give an appropriate explanation, but the more complex the simulation becomes, the more difficult it gets to recognize the present position of viewing.

2. Description of Related Art

In a prior art, the operator's present position is normally recognized by displaying numerical data regarding positional relationships between star fields, constellations, and celestial bodies with respect to each other. Such numerical data are, however, often not easily understandable even to the operator, much less to general viewers, and thus the operator, let alone the viewers, might fall into confusion caused by the imprecise recognition of their present position. The operator is thus required of much skill in order to prevent an erroneous operation, simulation, or explanation caused by such confusion. The viewers' lack of comprehension can spoil their zest for learning astronomy or they may lose interest in this field.

SUMMARY OF THE INVENTION

Accordingly, an object of this invention is to provide a planetarium in which one can readily recognize his position in a projected star field, and can easily understand positional relationships between star fields, constellations and celestial bodies in space with respect to each other.

In order to accomplish the above said object, a planetarium of the present invention comprises a dome, a projector for projecting a state of celestial bodies to the dome, input means for inputting a first viewpoint and a second viewpoint a first controller for controlling the projector which projects the state of the celestial bodies as observed from the first viewpoint an image displaying device for displaying a state of celestial bodies as observed from the second viewpoint either on a part of the dome or on other screen, a second controller for controlling the image displaying device for displaying the state of the celestial bodies as observed from the second viewpoint In the above described structure of the present invention, the first controller controls the projector based on the inputted first viewpoint for projecting the state of the celestial bodies as observed from the first viewpoint to the dome. At the same time, the second controller controls the image displaying device based on the inputted second viewpoint for displaying the state of the celestial bodies as observed from the second viewpoint on a part of the dome or on other screen.

Provided that a first viewpoint is defined as the operator's and the viewers' eyes and that a second viewpoint is set as a point from which the view observed from the first viewpoint as well as the first viewpoint, in this case the operators and the viewers, can be observed, the image as viewed from the second viewpoint becomes a bird's eye view overlooking the star fields, the constellation, and the celestial bodies as observed from the first viewpoint including the first viewpoint itself.

The viewers can easily and concretely perceive the positional relationships between themselves, the star fields, the constellation, and the celestial bodies with respect to each other, as well as their changes and any other celestial phenomena without any professional knowledge or skill. These two images projected and displayed simultaneously make the celestial phenomena more accessible to both the operator and the viewers, whereby helping the operator to conduct a smooth operation and to give a fluent explanation, as well as enhancing the viewers' understandings and interests in celestial bodies.

These and other objects and features of the present invention will become more apparent from the following description taken in conjunction with the accompanying drawings which illustrate specific embodiments of the invention.

DETAILED DESCRIPTION OF THE PREFERRED EMBODIMENT

Figure 9:
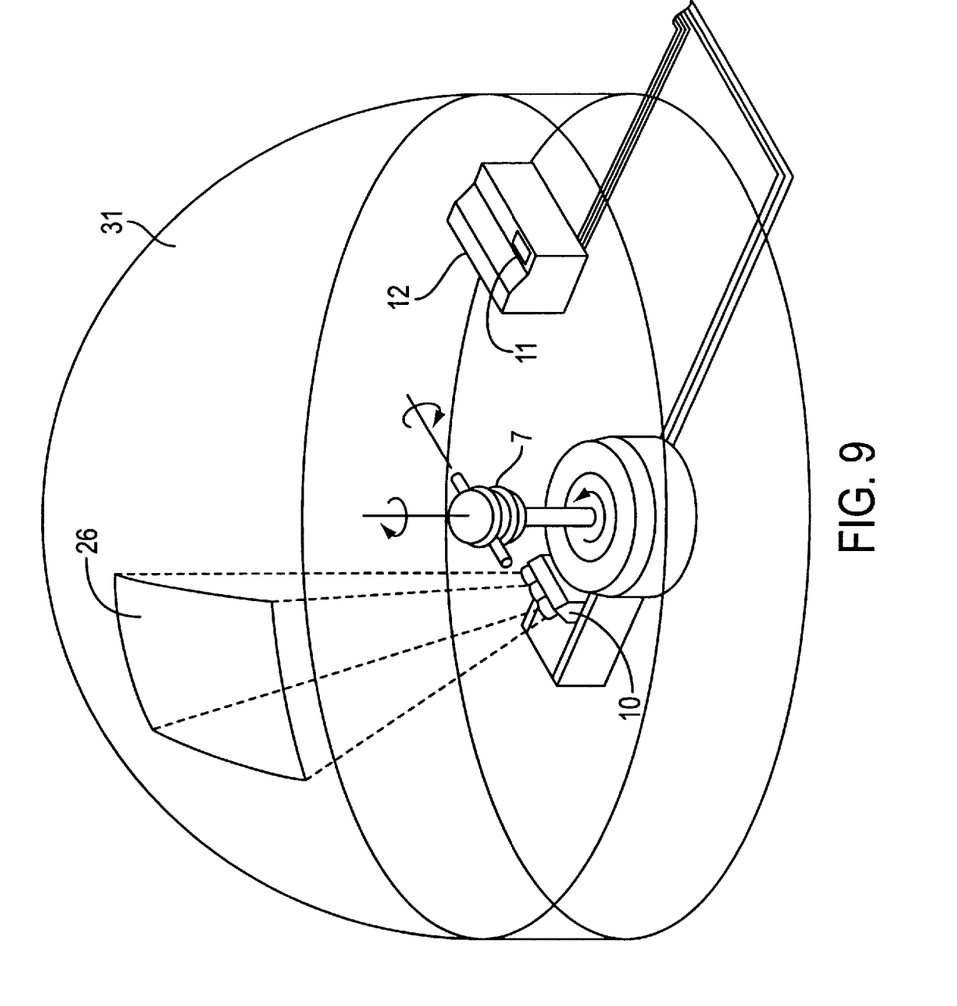
FIG. 9 is a perspective exterior view showing a structural outline of a planetarium of the present invention.

Referring to FIG. 9 which shows a structural outline of an embodiment of the present invention, a planetarium of the present invention comprises a dome 31, a projector 7 located inside the dome 31 onto which a state of star fields, constellations, and celestial bodies as observed from a first viewpoint is projected, a control panel 12, a display 11 on which a state of star fields, constellations, and celestial bodies as observed from a second viewpoint is displayed, and a video projector 10 for projecting the same image from the display 11 to a part of the dome 31 by video transmission.

Figure 1:
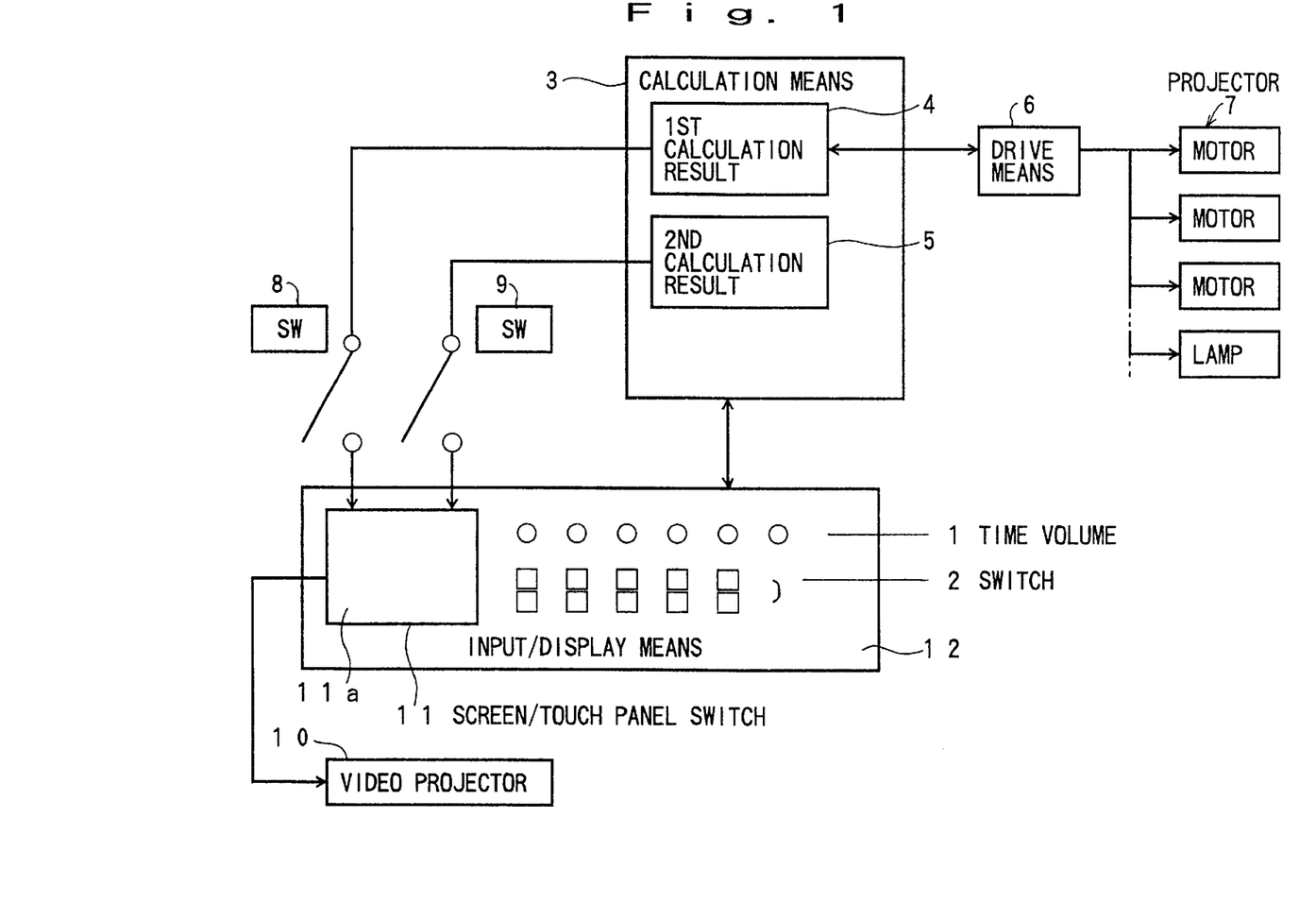
FIG. 1 is a block diagram showing a main structure of a planetarium of the present invention.

Not both of the display 11 and the video projector 10 must be necessarily provided, as they function secondarily for the operator's and the viewers' better understanding. If there is only the display 11 provided, it is preferably disposed as a part of the control panel 12 for the operator as shown in FIG. 1, or it may also be disposed at each seat for each viewer or at a certain distance for each predetermined number of viewers. In case that only the video projector 10 is provided, it is not necessary to dispose a plurality thereof, since both the operator and the viewers can see the same image projected thereby. It is, however, preferable to provide both the display 11 and the video projector 10 as in this embodiment.

The display 11 of this embodiment is designed for an operator and provided with touch-panel switches, whereby the operator can change displayed images on the screen and perform various inputting operations. The display 11 is thus appropriate for displaying images of a state of star fields, constellations, and celestial bodies as observed from a second viewpoint If the planetarium is used for an educational purpose, it will be more advantageous to dispose the display 11 at each seat for each viewer as described above. The display 11 of this embodiment can also display celestial bodies as observed from a first viewpoint.

The control panel 12 is further provided with time volumes 1 for inputting time, switch keys 2 for inputting parameters regarding various states of star fields, constellations, and celestial bodies, and switches SW8 and SW9 for selecting which image data as observed from a first viewpoint or a second viewpoint is to be transmitted to the display 11.

A control means 3 such as a microcomputer comprises a first calculation means 4 as a first controller and a second calculation means 5 as a second controller for calculating relative positions of star fields, constellations, and celestial bodies as observed from a first and a second viewpoints respectively, and their changes in positional relationships.

The control means 3 receives a first calculation result from the first calculation means 4 and a second calculation result from the second calculation means 5, each calculating numerical values relating to states of the star fields, the constellations, and the celestial bodies as observed from the first and the second viewpoints respectively, according to the data inputted from the control panel 12.

The control means 3 drives the projector 7 through a driving means 6 based on the first calculation result. The modules provided to the projector 7 and driven by the driving means 6 are driving motors to rotate each axis representing diurnal, nocturnal, and precessional motions, driving motors for each projector of planets and satellites or the like, and light source lamps for projecting fixed stars, planets, satellites and the like. The first or the second calculation result is alternatively connected to the display 11 by selecting SW 8 or 9, and the image is displayed when the selected calculation result is inputted.

The operation of the present invention will be hereinafter more specifically described referring to FIGS. 2 to 5.

Figure 2:
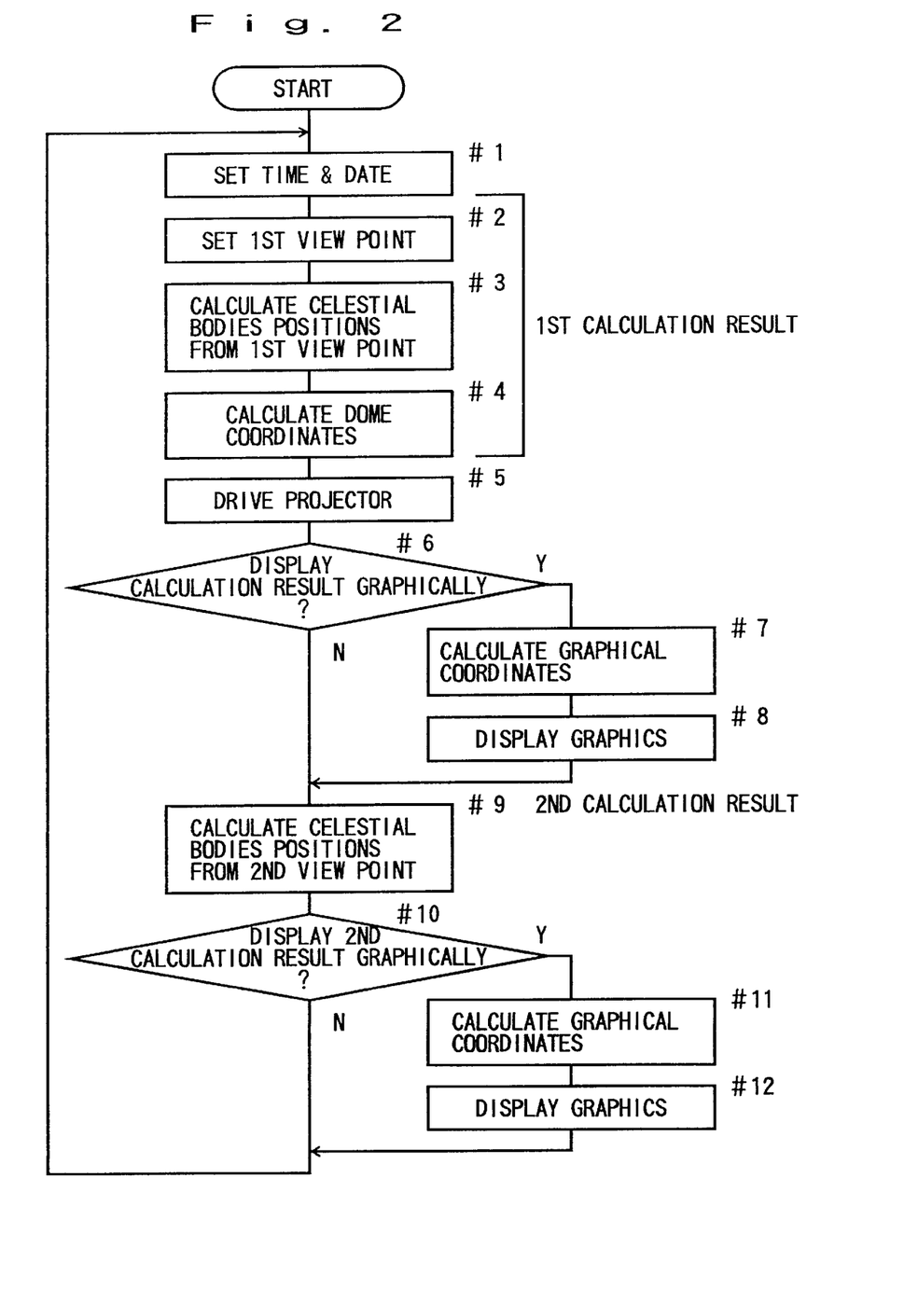
FIG. 2 is a flowchart showing a main operating process thereof.

As shown in the flowchart of an operating process in FIG. 2, a certain time and date of the simulation is defined in the step #1. Through defining a position of a first viewpoint in the step #2, calculating positions of celestial bodies from the first viewpoint in the step 3#, and through calculating dome coordinates in the step #4, the first calculation result is achieved. The state of star fields, the constellations, and the celestial bodies as observed from the first viewpoint is projected in the step #5 based on the first calculation result by driving the projector 7. In the step #6, it is decided whether to display the first calculation result on the display 11 in graphics. If it is to be displayed, graphical coordinates on a screen 11a of the display 11 are worked out in the step #7, and the first calculation result is displayed on the screen 11a in the step #8.

Figure 3:
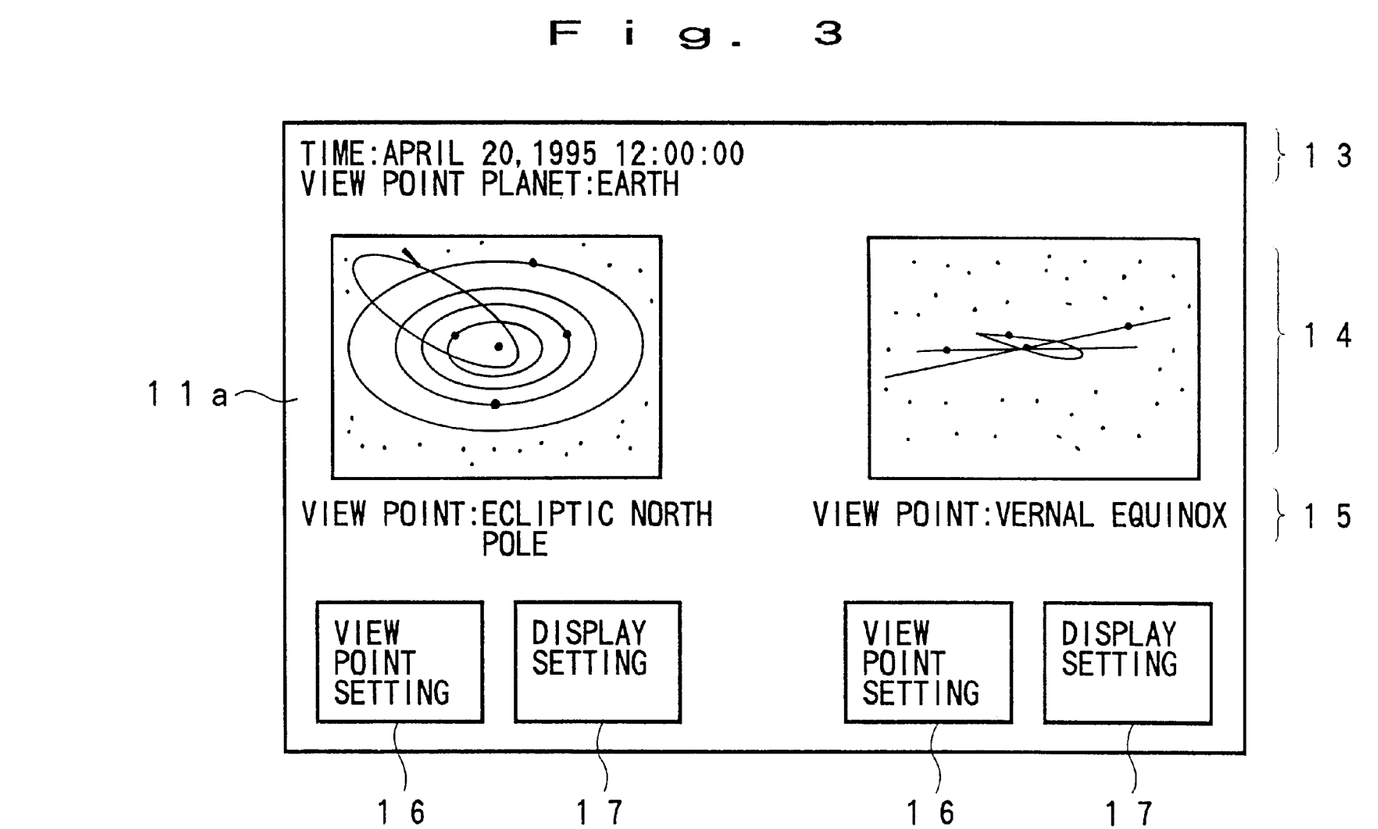
FIG. 3 is an example of a screen for selecting a viewpoint and a celestial body to be displayed in the operating process of FIG. 2.

As shown in a screen example of FIG. 3, a present time, date, and viewpoint planet 13, and viewpoints 15 appear on the screen 11a, together with graphical images 14 of star fields, constellations, and celestial bodies as observed from the viewpoints 15.

Figure 4:
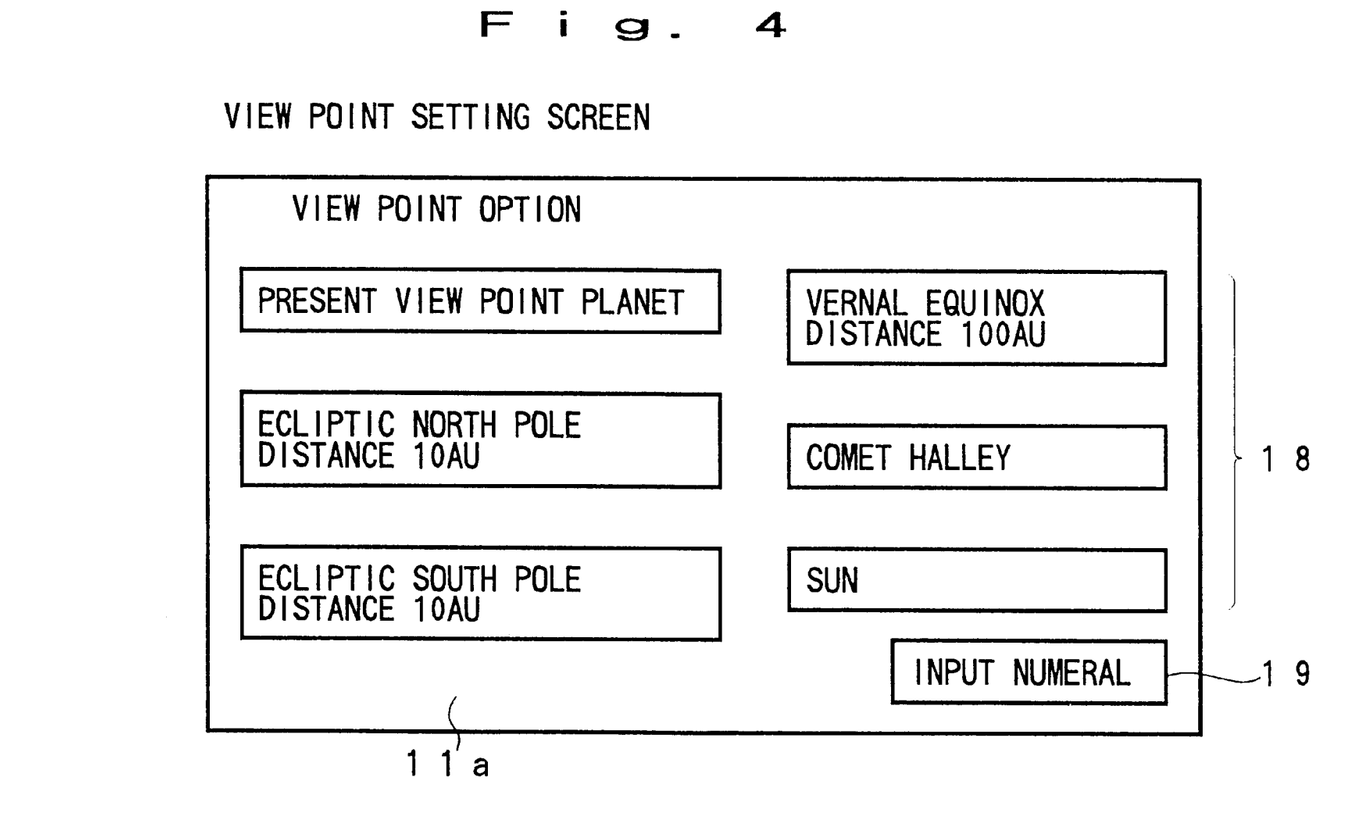
FIG. 4 is an example of a screen wherein a viewpoint is set in the operating process of FIG. 2.

After the step #6, or the step #7 and #8 in case of displaying the result of the first calculation as described above, a second calculation result is achieved in the step #9, by calculating positions of the star fields, the constellations, the celestial bodies, and the first viewpoint planet as observed from the second viewpoint The second viewpoint is readily and freely selected from a plurality of keys 18 which appear on a viewpoint setting screen as shown in FIG. 4 by operating viewpoint setting keys 16 on the screen 11a of FIG. 3. Numerical values can be also inputted by input means 2 on the control panel 12 by operating a numeral input key 19 on the screen 11a, allowing for the operator's need to input a specific right ascension, a declination, or a distance.

It is then decided in the following step #10 whether to display the second calculation result in graphics on the display 11 and/or the video projector 10. When the displaying is not necessary, the operating process ends there and is returned to its initial operation. When it is to be displayed, graphical coordinates on the display 11 are worked out in the step #11, and the second calculation result is displayed in the step #12.

Figure 5:
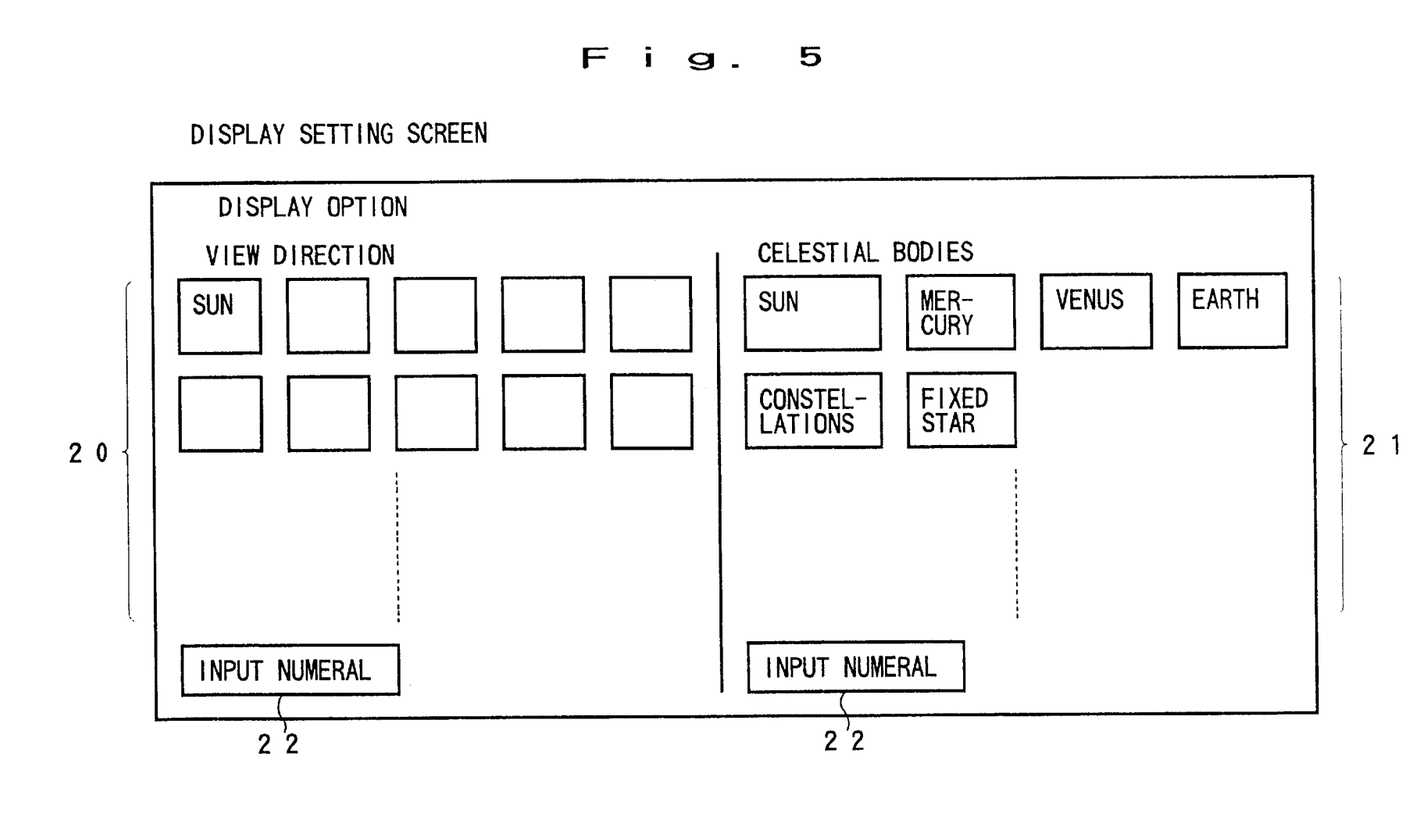
FIG. 5 is an example of a screen for selecting various display options in the operating process of FIG. 2.

More specifically, a plurality of direction keys 20 and celestial body keys 21 appear on a display setting screen as shown in FIG. 5 by operating display setting keys 17 on the screen 11a of FIG. 3. On the screen in FIG. 5 are also numeral input keys 22 for inputting specific numerical values relating to directions of viewing and celestial bodies to be displayed. By these optional keys on the screen 11a, a direction of viewing or a celestial body to be displayed can be readily and freely selected and corresponding calculations are automatically done, whereby an image of a state of the star fields, the constellations, the celestial bodies, and the first viewpoint as observed from the second viewpoint is defined to be displayed on the display 11 and/or the video projector 10.

Subsequently, the image defined as described above is displayed on the display 11 and/or the video projector 10 by inputting an image display start signal by the input means 2 on the control panel 12. The operator can comprehend celestial phenomena projected to the dome 31 more easily with the help of the image on the display 11. The viewers can also readily understand the same, with the help of a bird's eye view of the image including the first viewpoint as observed from the second viewpoint being projected to a part of the dome 31. Accordingly, the operator, being able to recognize the viewers' reaction objectively, can comfortably perform an operation of the planetarium or give a lecture depending on viewers' or students' requirements.

Figure 6:
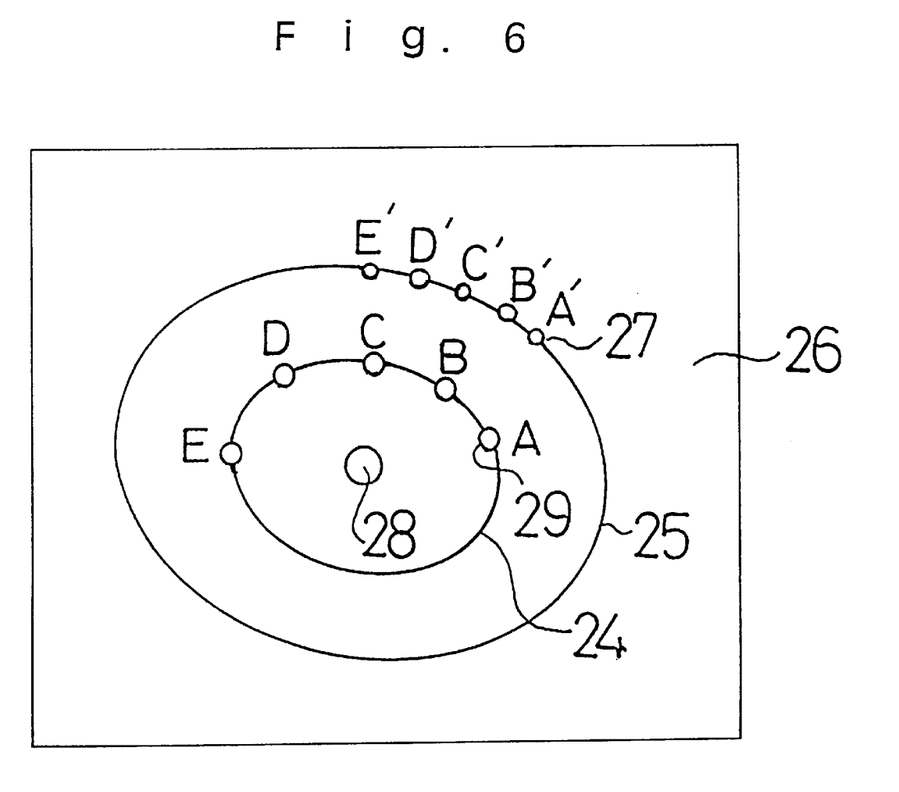
FIG. 6 is an explanatory view showing changes in positional relationships between the sun, the earth, and the mars to be displayed as observed from a second viewpoint

Two simulation examples will be hereinafter described referring to FIGS. 6 to 8.

SIMULATION EXAMPLE 1

Retrogradation of a Planet

This simulation example is designed for easier understanding of a retrograde motion of a planet. When, for example, the earth passes an outer planet having a slower velocity or is passed by an inner planet having a faster velocity, the planet or the earth apparently looks to be retrograding. It is necessary to exactly recognize the relative positions of the earth and the planet in order to understand this phenomenon.

In this simulation, the earth is set as a first viewpoint planet and a second viewpoint is set in the direction of the ecliptic north pole, and the sun, the earth, and the mars are selected as celestial bodies to be displayed. FIG. 6 shows the positions A, A' of the earth 29 and the mars 27 at a certain time. When the time is put forward by the time volume 1, the earth 29 and the mars 27 move along their orbits 24, 25 to B–E, B'–E', respectively, by their orbital motions. The image 26 showing the relative position of the planets as described above is projected onto a part of the dome 31 as shown in FIG. 7, while an image of the fixed star 28a and the mars 27 as observed from the earth is also projected on the dome 31. The time is simultaneously put forward on both screens so that the viewers can instantly perceive the relative positions of the stars at each stage, and understand in which configuration the planet appears to retrograde.

SIMULATION EXAMPLE 2
Seasonal Variation in Constellations

This simulation example allows for a better understanding of seasonal variation in constellations observed at night from the earth.

Figure 8:
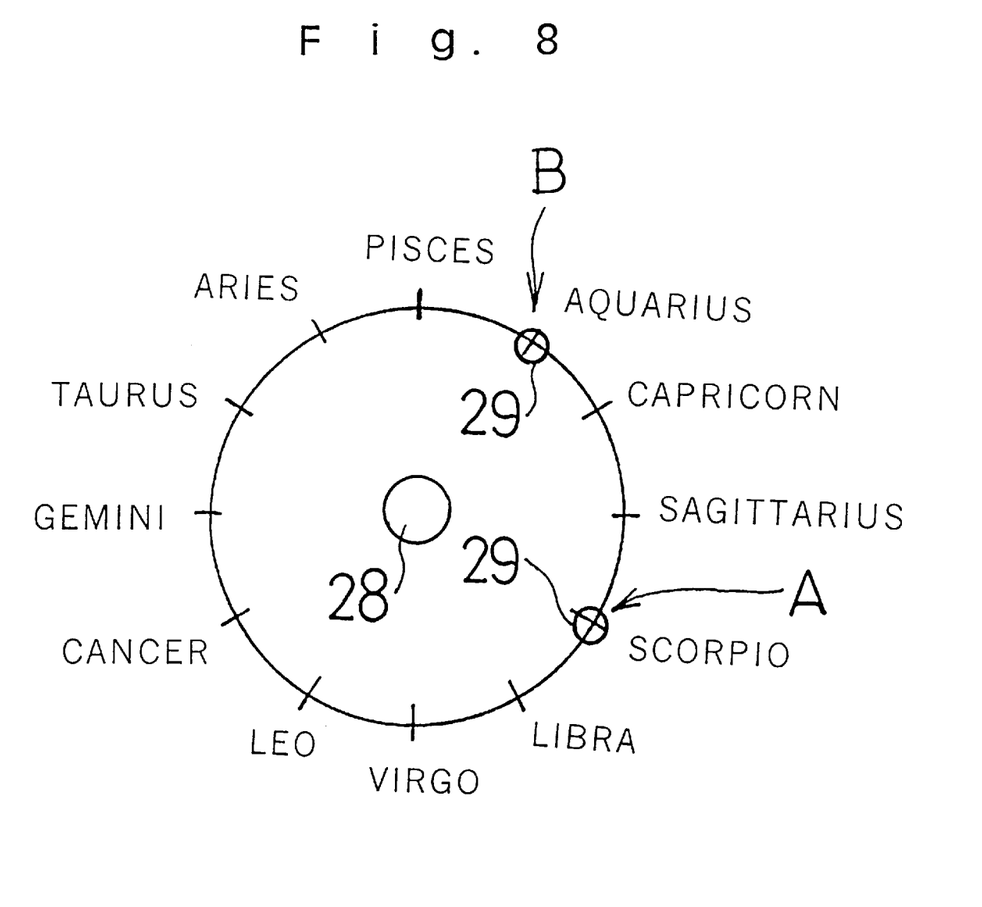
FIG. 8 is an explanatory view showing seasonal variation in constellations in a second simulation example.

Provided that the earth 29 is located at A in FIG. 8 at a certain time, the sun 28 is positioned in the direction of the Taurus. It is thus easily seen that the Taurus cannot be observed at this time of the year, whereas the Scorpius culminates at midnight.

When the time is put forward by the time volume 1, the earth 29 reaches the point B in FIG. 8 after 3 months by its orbital motion. At this time the sun 28 is located in the direction of the Leo, in which case the Aquarius culminates at midnight and the Leo cannot be observed.

Figure 7:
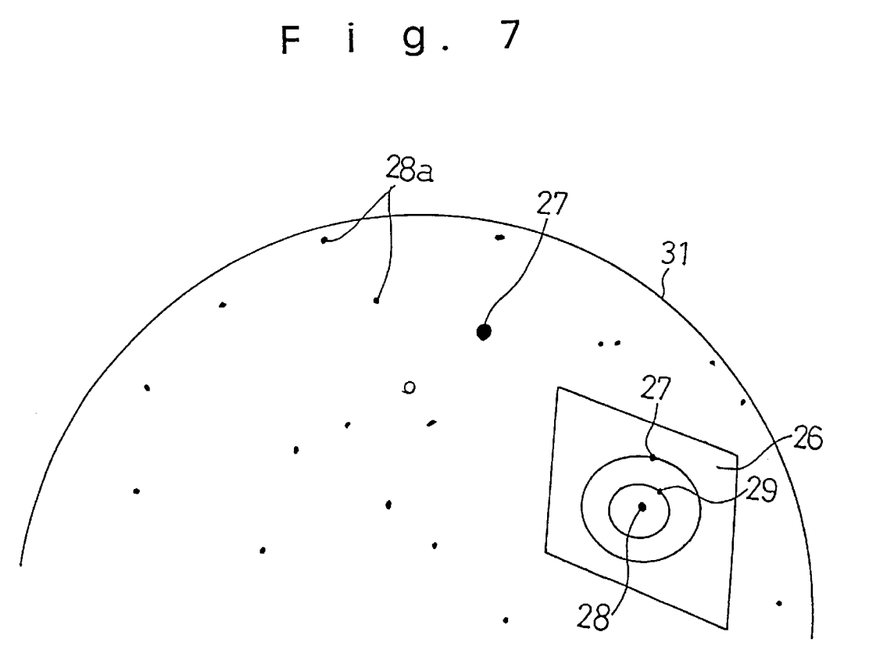
FIG. 7 is an explanatory view of a first simulation example showing an image of celestial bodies projected to a dome as observed from a first viewpoint and an image of celestial bodies displayed on a part of the dome as observed from a second viewpoint

The image showing the relative positions of the constellations as described above is displayed on a part of the dome 31 by the video projector 10, while the image of the sun 28 which moves between the constellations is being projected to the dome 31 as shown in FIG. 7. The time is simultaneously put forward on both screens, so that it is clearly seen which constellations can be observed and which can be not according to different seasons.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A planetarium for projecting a state of celestial bodies as observed from a first viewpoint onto a dome, comprising:
   a designating means for designating a second viewpoint being different from the first viewpoint; and
   a display means for displaying a state of celestial bodies as observed from the second viewpoint designated by the designating means.

2. The planetarium according to claim 1, wherein the display means projects the state of celestial bodies as viewed from the second viewpoint onto the dome.

3. The planetarium according to claim 2, wherein the display means projects the state of celestial bodies as viewed from the second viewpoint onto the dome where the state of celestial bodies as viewed from the first viewpoint is simultaneously being projected.

4. The planetarium according to claim 3, wherein the display means includes a video projector.

5. The planetarium according to claim 1 further comprises a control panel for controlling operations of the planetarium, and the display means displays the state of celestial bodies as viewed from the second viewpoint on the control panel.

6. The planetarium according to claim 1 further comprises a plurality of viewers' seats, and the display means is provided at each seat.

7. The planetarium according to claim 1, wherein the display means displays a state of celestial bodies as viewed from the second viewpoint, the state of celestial bodies including the first viewpoint.

8. The planetarium according to claim 1, wherein the designating means can designate any point of any celestial bodies as the second viewpoint.

9. A planetarium comprising:
   a dome;
   a first calculation means for determining the state of celestial bodies as viewed from a first viewpoint at a given time and date;
   a projector for projecting the state of celestial bodies as viewed from the first viewpoint onto the dome determined by the first calculation means;
   a second calculation means for determining a state of celestial bodies as viewed from a second viewpoint being different from the first viewpoint; and
   a display means for displaying the state of celestial bodies as viewed from the second viewpoint determined by the second calculation means.

10. The planetarium according to claim 9 further comprises a control panel for setting any time and date, and the first calculation means determines a state of celestial bodies at the time and date set on the control panel.

11. The planetarium according to claim 10, wherein the display means displays a state of celestial bodies on the control panel.

12. The planetarium according to claim 9, wherein the display means projects the state of celestial bodies as viewed from the second viewpoint onto the dome.

13. The planetarium according to claim 12, wherein the display means projects the state of celestial bodies as viewed from the second viewpoint onto the dome where the state of celestial bodies as viewed from the first viewpoint is simultaneously being projected.

14. The planetarium according to claim 13, wherein the display means includes a video projector.

15. The planetarium according to claim 9 further comprises a plurality of viewers' seats, and the display means is provided at each seat.

16. The planetarium according to claim 9, wherein the second calculation means determines a state of celestial bodies as viewed from the second viewpoint, the state of celestial bodies including the first viewpoint.

* * * * *